(12) United States Patent
Ochi et al.

(10) Patent No.: US 7,867,653 B2
(45) Date of Patent: Jan. 11, 2011

(54) ALKALINE STORAGE BATTERY SYSTEM

(75) Inventors: Makoto Ochi, Moriguchi (JP);
Atsutoshi Ako, Moriguchi (JP);
Yasuyuki Harada, Moriguchi (JP);
Kazuhiro Kitaoka, Moriguchi (JP);
Masao Takee, Moriguchi (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 0 days.

(21) Appl. No.: 12/238,813

(22) Filed: Sep. 26, 2008

(65) Prior Publication Data

US 2009/0087741 A1    Apr. 2, 2009

(30) Foreign Application Priority Data

Sep. 28, 2007   (JP) ............................. 2007-253991

(51) Int. Cl.
*H01M 10/32* (2006.01)
*H01M 4/32* (2006.01)
*H01M 4/52* (2006.01)

(52) U.S. Cl. ...................................... 429/206; 429/233
(58) Field of Classification Search ................. 429/206, 429/223
See application file for complete search history.

(56) References Cited

U.S. PATENT DOCUMENTS

| | | | | |
|---|---|---|---|---|
| 5,132,177 A | * | 7/1992 | Kawano et al. ............. | 429/206 |
| 5,467,006 A | * | 11/1995 | Sims .............................. | 237/5 |
| 2004/0265689 A1 | | 12/2004 | Ochi et al. | |

FOREIGN PATENT DOCUMENTS

| DE | 4143645 C2 | 9/1991 |
|---|---|---|
| EP | 0905855 A2 | 3/1999 |
| EP | 1176649 A1 | 1/2002 |
| JP | 2005108610 A | 4/2005 |
| WO | 2004051296 A1 | 6/2004 |

OTHER PUBLICATIONS

Shinyama et al., "Deterioiration mechanism of nickel metal-hydride batteries for hybrid electric vehicles", J. of Power Sources 141 (2005), pp. 193-197.*

Taniguchi et al., "Development of nickel/metal-hydride batteries for EVs and HEVs", J. of Power Sources 100 (2001), pp. 117-124.*

Chen, J. et al.; "Development of High Energy Nickel-Metal Hydride Cell"; Battery Conference on Applications and Advances, pp. 405-409, Jan. 13, 1998.

European Search Report dated Feb. 5, 2009, issued in corresponding European Patent Application No. 08016918.8.

* cited by examiner

*Primary Examiner*—Gregg Cantelmo
(74) *Attorney, Agent, or Firm*—Westerman, Hattori, Daniels & Adrian, LLP

(57) ABSTRACT

An alkaline storage battery system according to an aspect of the present invention, with which a partial charging-discharging is performed, includes an alkaline storage battery 10 including an electrode group having a nickel positive electrode 11, a hydrogen storage alloy negative electrode 12, a separator 13; an alkaline electrolyte; and an outer can 14 accommodating the electrode group and the alkaline electrolyte, and further includes a partial charge-discharge control unit for controlling charging-discharging of the battery 10. In addition, zinc (Zn) is added to nickel hydroxide that is a main positive electrode active material in the nickel positive electrode 11 with an addition amount of 5% by mass or less with respect to the mass of nickel in the positive electrode active material. The concentration of the alkaline electrolyte is 6.5 mol/L or less and the content of lithium in the alkaline electrolyte is 0.3 mol/L or more.

2 Claims, 1 Drawing Sheet

ALKALINE STORAGE BATTERY SYSTEM

TECHNICAL FIELD

The present invention relates to an alkaline storage battery including an electrode group having a hydrogen storage alloy negative electrode using a hydrogen storage alloy as a negative electrode active material, a nickel positive electrode, and a separator, and further including an alkaline electrolyte, in an outer can, and especially relates to an alkaline storage battery system suitable for vehicle applications such as for a hybrid electric vehicle (HEV) and for a pure electric vehicle (PEV).

BACKGROUND ART

Recently, secondary batteries have been used for various applications, for example, cell phones, personal computers, power tools, HEVs, and PEVs, and alkaline storage batteries have come to be used for these applications. Among these applications, especially in alkaline storage batteries used for consumer applications such as cell phones, personal computers, and power tools, a complete charge-discharge control method wherein complete charging-discharging is performed is applied.

It is known that addition of zinc to a positive electrode mixture having nickel hydroxide as a main positive electrode active material is generally effective to improve the cycle life of an alkaline storage battery wherein the complete charging-discharging is performed. In this case, zinc is generally added to the positive electrode mixture so as to be approximately 15% by mass with respect to the mass of nickel as the positive electrode active material. The addition of such amount of zinc makes it possible to inhibit swelling of the positive electrode active material associated with the charge-discharge cycle and to extend the life of the battery.

Meanwhile, in alkaline storage batteries used for applications relating to vehicles such as HEVs and PEVs, a partial charge-discharge control ($\Delta$SOC-pulse Cycle) method is widely used for performing partial charging-discharging. For example, JP-A-2005-108610 discloses an alkaline storage battery suitable for the partial charge-discharge control method for performing partial charging-discharging.

On the other hand, in such alkaline storage batteries, with which partial charging-discharging is performed, used for such applications relating to vehicles as HEVs and PEVs, it is known that a memory effect is a main factor for reduction of the partial charge-discharge cycle life. Accordingly, it has been revealed that in the alkaline storage batteries used for such applications, the addition of zinc to the positive electrode mixture by approximately 15% by mass with respect to the mass of nickel as the positive electrode active material does not improve the charge-discharge cycle life, but adversely affect the battery with the added zinc serving as a resistance component.

Furthermore, in the alkaline storage battery disclosed in JP-A-2005-108610, the concentration of an alkaline electrolyte is as high as 7 mol/L (7 N), and the amount of lithium (Li) contained in the alkaline electrolyte is as small as 0.05 mol/L (0.05 N). As a result, the memory effect is not improved, whereby a charge-discharge cycle characteristic is not improved.

Therefore, as a result of extensive studies on the reasons, the inventors of the present invention have found that, for alkaline storage batteries with which partial charging-discharging is performed, reducing the addition amount of zinc contained in the positive electrode mixture inhibits the memory effect so that the batteries have a long life. Furthermore, they have also found that making the concentration of the alkaline electrolyte less than 7 mol/L (7 N) and increasing the amount of lithium (Li) contained in the alkaline electrolyte inhibit the memory effect increases the life of the batteries.

SUMMARY

An advantage of some aspects of the invention is to provide an alkaline storage battery system with which partial charging-discharging is performed, that synergistically exhibits an effect of reducing the addition amount of zinc to a positive electrode mixture, an effect of reducing the concentration of an alkaline electrolyte, and an effect of increasing the content of lithium in the alkaline electrolyte.

According to a first aspect of the invention, an alkaline storage battery system includes an alkaline storage battery including an electrode group having a hydrogen storage alloy negative electrode using a hydrogen storage alloy as a negative electrode active material, a nickel positive electrode using nickel hydroxide as a main positive electrode active material, and a separator; an alkaline electrolyte; and an outer can accommodating the electrode group and the alkaline electrolyte. Furthermore, zinc (Zn) is added to nickel hydroxide that is the main positive electrode active material in the nickel positive electrode with an addition amount of 5% by mass or less with respect to the mass of nickel in the positive electrode active material, the alkaline electrolyte has a concentration of 6.5 mol/L or less, the alkaline electrolyte contains lithium (Li) of 0.3 mol/L or more, and the alkaline storage battery system is arranged to enable partial charge-discharge control.

Here, in an alkaline storage battery system with which the partial charging-discharging is performed, it has been revealed that reducing the addition amount of zinc to the positive electrode mixture improves the memory effect so that the battery has a long life. Furthermore, when the concentration of the alkaline electrolyte is 6.5 mol/L (6.5 N) or less and the amount of lithium (Li) contained in the alkaline electrolyte is 0.3 mol/L (0.3 N) or more, it has been revealed that the memory effect improves so that the battery has a long life. Furthermore, it has been proved that an effect of reducing the addition amount of zinc to the positive electrode mixture, an effect of reducing the concentration of the alkaline electrolyte, and an effect of increasing the content of lithium in the alkaline electrolyte can be achieved as synergistic effects.

In this case, the nickel positive electrode is preferably formed of a nickel sintered plate having pores filled with at least nickel hydroxide as the main positive electrode active material and zinc by impregnation treatment with an impregnation liquid and alkaline treatment. This is because it is easier to control the addition amount of zinc so as to be 5% by mass or less with respect to the amount of nickel in the positive electrode active material by the solution impregnation. It is preferred that the alkaline electrolyte be a mixed alkaline aqueous solution containing sodium hydroxide, potassium hydroxide, and lithium hydroxide.

The partial charging-discharging is controlled so that discharging will be stopped and charging will be started when the voltage reaches a level at which there occurs no variation among a plurality of batteries combined in a battery pack (in this case, a voltage level reaching a state of charge (SOC) of 10%), and so that charging will be stopped and discharging will be started when the voltage reaches a level just before reaching the oxygen overvoltage (in this case, a voltage level reaching an SOC of 95%). Practically, it is preferred that the partial charging-discharging be controlled so that discharging will be stopped and charging will be started when the voltage level reaches an SOC of 20% and so that charging will be stopped and discharging will be started when the voltage level reaches an SOC of 80%.

Some aspects of the invention provide an alkaline storage battery system with a long life that synergistically exhibits effect of reducing the addition amount of zinc to the positive electrode mixture, the effect of reducing the concentration of the alkaline electrolyte, and the effect of increasing the content of lithium in the alkaline electrolyte, so that the memory effect is inhibited, since the addition amount of zinc to the positive electrode mixture is limited, the concentration of the alkaline electrolyte is low, and the lithium content in the alkaline electrolyte is high.

BRIEF DESCRIPTION OF THE DRAWING

The invention will be described with reference to the accompanying drawing, wherein like numbers reference like elements.

DESCRIPTION OF EXEMPLARY EMBODIMENTS

Figure 1:
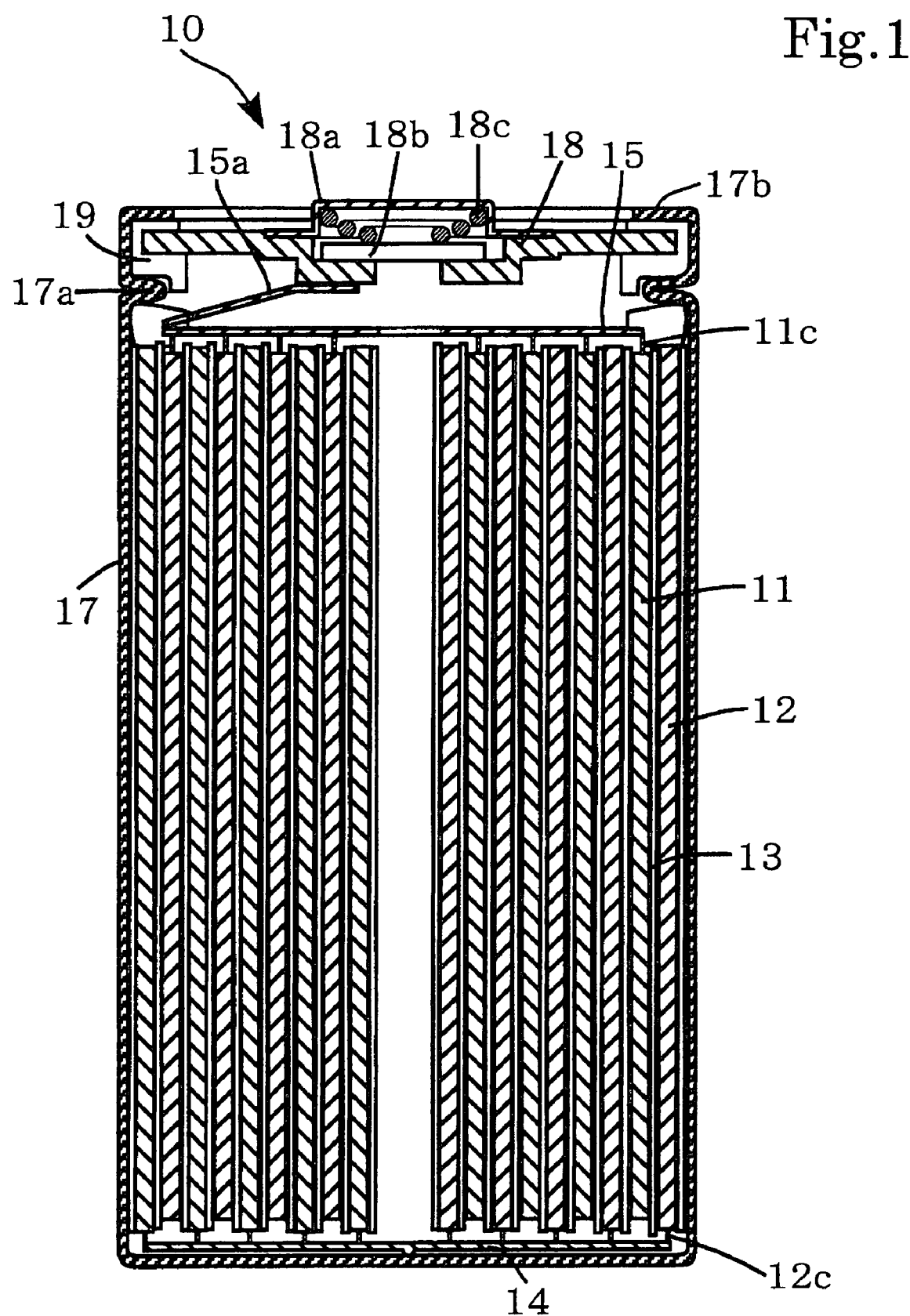
FIG. 1 is a sectional view schematically showing a nickel-hydrogen storage battery according to an embodiment of the invention.

Embodiments of the invention will now be described below in detail with reference to FIG. 1, but the invention is not limited to the embodiments and may be variously modified within the scope of the purpose of the invention. FIG. 1 is a sectional view schematically showing an alkaline storage battery according to an embodiment of the invention.

1. Nickel Positive Electrode

A nickel positive electrode 11 of the invention was formed by filling a predetermined amount of nickel hydroxide and zinc hydroxide in pores of a nickel sintered plate as a substrate.

In this case, the nickel sintered plate was prepared in the following manner. First, for example, methyl cellulose (MC) as a thickener, polymer hollow microspheres (for example, 60 μm of pore size), and water were mixed with nickel powder, and the whole was kneaded to prepare a nickel slurry. Next, the nickel slurry was coated on both sides of a punching metal of a nickel coated steel sheet, then the punching metal was heated at 1,000° C. under reducing atmosphere to burn out the coated thickener and polymer hollow microspheres, and the nickel powder was sintered with each other to prepare the nickel sintered plate.

Then, after impregnation of the obtained nickel sintered plate with an impregnation liquid described below, an alkaline treatment with an alkaline treatment liquid was repeated a predetermined number of times to fill a predetermined amount of nickel hydroxide and zinc hydroxide in pores of the nickel sintered plate. Then, the nickel sintered plate was cut into a predetermined size (for example, 80.0 cm×5.0 cm) to prepare the nickel positive electrode 11 filled with a positive electrode active material. Here, an electrode which was formed so as to be a ratio of the mass of zinc in zinc hydroxide to the mass of nickel in nickel hydroxide as the positive electrode active material of 5% by mass was regarded as a nickel positive electrode x, and an electrode which was formed so as to be the ratio of 15% by mass was regarded as a nickel positive electrode y.

In this case, a mixed aqueous solution having a molar ratio of nickel nitrate to zinc nitrate of 100:5 and a specific gravity of 1.8 was used for the impregnation liquid, and a sodium hydroxide (NaOH) aqueous solution having a specific gravity of 1.3 was used for the alkaline treatment liquid. For improving high temperature characteristic and the like, an impregnation liquid further containing cobalt nitrate, yttrium nitrate, ytterbium nitrate and the like may be used.

Then, after the nickel sintered plate was immersed in the impregnation liquid to impregnate the impregnation liquid in the pores of the nickel sintered plate, the nickel sintered plate was dried and then immersed in the alkaline treatment liquid for performing the alkaline treatment. Nickel salt and zinc salt on were converted into nickel hydroxide and zinc hydroxide by the treatment. Then, the nickel sintered plate was washed sufficiently with water to remove the alkaline solution and dried. A series of filling operations of the positive electrode active material, namely impregnation with the impregnation liquid, drying, immersion to the alkaline treatment liquid, water washing, and drying, was repeated 6 times to fill a predetermined amount of the positive electrode active material in the nickel sintered plate.

An impregnation liquid having a molar ratio of nickel nitrate to zinc nitrate of 100:5 was used for forming the nickel positive electrode x having the ratio of the mass of zinc to the mass of nickel of 5% by mass. Furthermore, an impregnation liquid having a molar ratio of nickel nitrate to zinc nitrate of 100:15 was used for forming the nickel positive electrode y having the ratio of the mass of zinc to the mass of nickel of 15% by mass.

2. Hydrogen Storage Alloy Negative Electrode

A hydrogen storage alloy negative electrode 12 was formed by filling hydrogen storage alloy slurry in a negative electrode sheet of punching metal. In this case, for example, neodymium (Nd), magnesium (Mg), nickel (Ni), cobalt (Co), and aluminum (Al) were mixed with a predetermined molar ratio, and then the mixture was dissolved in a high-frequency induction heater, and then cooled to prepare a hydrogen storage alloy ingot. Then, the hydrogen storage alloy ingot was heat-treated at 1,000° C. under argon gas atmosphere for 10 hours to control the crystal structure in the ingot. The obtained hydrogen storage alloy was pulverized mechanically under inert atmosphere, and the alloy powder between 400 and 200 mesh was selected by a screening. An average particle diameter which indicated 50% of mass integral was 25 μm by a measurement of particle size distribution of the powder using a laser scattering particle size distribution analyzer. The obtained powder was regarded as the hydrogen storage alloy powder.

Then, 0.5 parts by mass of SBR (styrene butadiene rubber) as a water insoluble polymer binder, 0.03 parts by mass of CMC (carboxymethyl cellulose) as a thickener, and a suitable amount of pure water were added to 100 parts by mass of the obtained hydrogen storage alloy powder, and the whole was kneaded to prepare a hydrogen storage alloy slurry. Then, the obtained hydrogen storage alloy slurry was coated on both sides of the negative electrode sheet of the punching metal (made of nickel coated steel plate), and the negative electrode sheet was dried at 100° C., rolled so as to be a predetermined packing density, and then cut into a predetermined size (for example, 3.5 cm×3.5 cm) to prepare a hydrogen storage alloy negative electrode.

3. Nickel-Hydrogen Storage Battery

Next, a separator 13 made of polyolefin nonwoven fabric having a basis weight of 55 g/cm² was interposed between the nickel positive electrode 11 (x or y) and the hydrogen storage alloy negative electrode 12 prepared as described above, and the whole unit was rolled spirally to prepare a spiral electrode group. A nickel coated steel sheet exposure part 11c of the nickel positive electrode 11 was exposed at an upper part of the spiral electrode group prepared above, and a negative electrode sheet exposure part 12c of the hydrogen storage alloy negative electrode 12 was exposed at a lower part of the spiral electrode group. Next, a negative electrode collector 14 was welded to the negative electrode sheet exposure part 12c exposed from a lower end face of the obtained spiral electrode group, and a positive electrode collector 15 was welded on the nickel coated steel sheet exposure part 11c of the nickel electrode 11 exposed from an upper end face of the spiral electrode group to prepare an electrode.

Next, the obtained electrode was placed in an iron outer can coated with nickel 17, having a cylindrical shape with a base plate (an outer bottom face of the outer can was a negative electrode external terminal), and then the negative electrode collector 14 was welded to an inner bottom face of the outer can 17. Meanwhile, a collector lead part 15a extended from the positive electrode collector 15 was welded to a bottom part of a cover 18 which was used as a positive electrode terminal and had an insulating gasket 19 on a peripheral part of the cover. The cover 18 had a positive electrode cap 18a, and a pressure valve having a valve 18b and a spring 18c was placed in the positive electrode cap 18a (not shown), so that the valve would be deformed at a predetermined pressure.

Next, after an annular groove part 17a was formed on an upper peripheral part of the outer can 17, an electrolyte was poured, and the insulating gasket 19 fitted on the peripheral part of the cover 18 was placed on the annular groove part 17a formed on the upper part of the outer can 17. Then, an open end 17b of the outer can 17 was crimped to prepare a nickel-hydrogen storage battery 10 (A, B, C, D, E) having a nominal capacity of 6 Ah and a D size (32 mm diameter and 60 mm high). In this case, an alkaline electrolyte (a mixed aqueous solution of sodium hydroxide (NaOH), potassium hydroxide (KOH), and lithium hydroxide (LiOH)) was poured in the outer can 17 so as to be 2.5 g per battery capacity (Ah) (2.5 g/Ah).

Here, in the above mentioned alkaline electrolyte, an electrolyte having an electrolyte concentration of 6.5 mol/L (6.5 N) and a Li concentration of 0.33 mol/L (0.33 N) was regarded as an alkaline electrolyte a. Furthermore, an electrolyte having an electrolyte concentration of 7.0 mol/L (7.0 N) and a Li concentration of 0.21 mol/L (0.21 N) was regarded as an alkaline electrolyte b. Furthermore, an electrolyte having an electrolyte concentration of 6.5 mol/L (6.5 N) and a Li concentration of 0.19 mol/L (0.19 N) was regarded as an alkaline electrolyte c. Furthermore, an electrolyte having an electrolyte concentration of 7.0 mol/L (7.0 N) and a Li concentration of 0.35 mol/L (0.35 N) was regarded as an alkaline electrolyte d.

In addition, a battery using the nickel positive electrode y and the alkaline electrolyte b was regarded as a battery A, a battery using the nickel positive electrode x and the alkaline electrolyte b was regarded as a battery B, a battery using the nickel positive electrode y and the alkaline electrolyte c was regarded as a battery C, a battery using the nickel positive electrode y and the alkaline electrolyte d was regarded as a battery D, and a battery using the nickel positive electrode x and the alkaline electrolyte a was regarded as a battery E.

4. Battery Capacity Measurement (1) Initial Capacity

Each of the batteries A, B, C, D, and E was charged at 25° C. and at 0.5 It of charging current to 120% of the battery capacity (nominal capacity), the charging was stopped for 1 hour, then the battery was discharged at 1.0 It of discharging current until the battery voltage reached 1.0 V, and the initial capacity X1 of each of the batteries A, B, C, D, and E was calculated from discharge time at the time.

(2) Capacity after Partial Charge-Discharge Cycle

Next, a partial charge-discharge cycle test was performed in the following manner. A charge-discharge cycle was repeated wherein each of the batteries A, B, C, D, and E was charged at 10 It of charging current until the voltage reached a state of charge (SOC) of 80%, and then each battery was discharged at 10 It of discharging current until the voltage reached an SOC of 20%. Then, the partial charge-discharge cycle was repeated until the discharge strength reached 10 kAh.

Then, a battery capacity X2 of each of the batteries A, B, C, D, and E after a partial charge-discharge cycle (a capacity after a partial charge-discharge cycle) was calculated in the same manner as the initial capacity measurement. Next, after calculating a ratio of the capacity X2 after a partial charge-discharge cycle to the initial capacity X1 obtained as an initial capacity ratio (X2/X1), a relative value of the initial capacity ratio of each of the other batteries B, C, D, and E to that of the battery A (100) was calculated, and the results are shown in Table 1 below.

(3) Capacity after Complete Charge-Discharge Cycle

Meanwhile, a complete charge-discharge cycle test was performed in the following manner. A charge-discharge cycle wherein each of the batteries A, B, and E was charged at room temperature (approximately 25° C.) at 1 It of charging current until full charge, the charging was stopped for 1 hour when the battery voltage of 10 mV fell down (·ΔV=10 mV), and then the battery was discharged at 1 It of discharging current until the cutoff voltage reached 0.9 V was repeated. Then, the complete charge-discharge cycle was repeated until the discharge strength reached 10 kAh.

Then, a battery capacity X3 after a complete charge-discharge cycle of each of the batteries A, B, and E (a capacity after compete charge-discharge cycle) was calculated in the same manner as the initial capacity measurement. Next, after calculating a ratio of the capacity X3 after a complete charge-discharge cycle to the initial capacity X1 obtained in advance as an initial capacity ratio (X3/X1), a relative value of the initial capacity ratio of each of the other batteries B and E to that of the battery A (100) was calculated, and the results are shown in Table 1 below.

TABLE 1

| battery system type | battery type | Zn amount in positive electrode (to Ni) (% by mass) | details of alkaline electrolyte | | charge-discharge condition | initial capacity ratio (to A1) |
| | | | electrolyte concentration (mol/L) | Li concentration (mol/L) | | |
| --- | --- | --- | --- | --- | --- | --- |
| A1 | A | 15 | 7.0 | 0.21 | p*¹ | 100 |
| B1 | B | 5 | 7.0 | 0.21 | p*¹ | 105 |
| C1 | C | 15 | 6.5 | 0.19 | p*¹ | 101 |
| D1 | D | 15 | 7.0 | 0.35 | p*¹ | 105 |

TABLE 1-continued

| battery system type | battery type | Zn amount in positive electrode (to Ni) (% by mass) | electrolyte concentration (mol/L) | Li concentration (mol/L) | charge-discharge condition | initial capacity ratio (to A1) |
|---|---|---|---|---|---|---|
| E1 | E | 5 | 6.5 | 0.33 | p*1 | 130 |
| A2 | A | 15 | 7.0 | 0.21 | c*2 | 90 |
| B2 | B | 5 | 7.0 | 0.21 | c*2 | 60 |
| E2 | E | 5 | 6.5 | 0.33 | c*2 | 70 |

*1 partial charge-discharge
*2 complete charge-discharge

From the results of Table 1 shown above, (a) the addition amount of zinc in the nickel positive electrode, (b) the concentration of the alkaline electrolyte, (c) the concentration of lithium in the alkaline electrolyte, and (d) the synergistic effect of the addition amount of zinc and the alkaline electrolyte and the like will be discussed below.

(a) Effect of Addition Amount of Zinc in Nickel Positive Electrode

First, the battery A using the nickel positive electrode y with the ratio of the mass of zinc to the mass of nickel in the nickel positive electrode of 15% by mass and the battery B using the nickel positive electrode x with the ratio of 5% by mass are compared. Here, when the charge-discharge condition is the complete charge-discharge, it is demonstrated that the battery A using the nickel positive electrode y with the addition amount of zinc of 15% by mass has an advantage in the initial capacity ratio. Meanwhile, when the charge-discharge condition is the partial charge-discharge, it is demonstrated that the initial capacity ratio is more improved in the battery B using the nickel positive electrode x with the addition amount of zinc of 5% by mass, and the battery B with the less addition amount of zinc is more advantageous.

When the charge-discharge condition is the complete charge-discharge as used for the consumer applications till now, if the ratio of the mass of zinc to the mass of nickel in the nickel positive electrode is high, a swelling of the positive electrode accompanied with charge-discharge cycles is inhibited to improve a capacity retention ratio (an initial capacity ratio) after a charge-discharge cycle. On the other hand, it is demonstrated that the effect is not achieved in the partial charge-discharge cycle used for the applications relating to vehicles such as HEVs and PEVs. Conversely, it has been revealed that the less addition amount of zinc in the nickel positive electrode enables to inhibit the memory effect accompanied with the partial charge-discharge cycle, so that the capacity retention ratio after a partial charge-discharge cycle is improved.

However, if only the addition amount of zinc in the nickel positive electrode is reduced, the capacity retention ratio after a partial charge-discharge cycle is not sufficient.

(b) Effect of Alkaline Electrolyte Concentration

Next, the battery A using the alkaline electrolyte b with the concentration of alkaline electrolyte of 7.0 mol/L (7.0 N) and the battery C using the alkaline electrolyte c with the concentration of alkaline electrolyte of 6.5 mol/L (6.5 N) are compared, wherein the Li concentration of the battery A is 0.21 mol/L (0.21 N) and that of the battery C is 0.19 mol/L (0.19 N), so that the Li concentrations of both batteries are nearly equal. Then, it is demonstrated that the capacity retention ratio after a partial charge-discharge cycle of the battery C using the alkaline electrolyte c with the low concentration is 101 and is improved a little more than the capacity retention ratio after a partial charge-discharge cycle of the battery A using the alkaline electrolyte b with the high concentration. However, if only the concentration of alkaline electrolyte is reduced, the capacity retention ratio after a partial charge-discharge cycle is not sufficient.

(c) Effect of Lithium Concentration in Alkaline Electrolyte

Meanwhile, the battery A using the alkaline electrolyte b with the lithium concentration of 0.21 mol/L (0.21 N) and the battery D using the alkaline electrolyte d with the lithium concentration of 0.35 mol/L (0.35 N) are compared, wherein both concentrations of the alkaline electrolytes are equal. Then, it is demonstrated that the capacity retention ratio after a partial charge-discharge cycle of the battery D using the alkaline electrolyte d with the high lithium concentration is 105 and is improved a little more than the capacity retention ratio after a partial charge-discharge cycle of the battery A using the alkaline electrolyte a with the low lithium concentration. However, if only the lithium concentration in the alkaline electrolyte increases, the capacity retention ratio after a partial charge-discharge cycle is not sufficient.

(d) Synergistic Effect of Addition Amount of Zinc and Alkaline Electrolyte

Therefore, the battery system A1 wherein the battery A (the nickel positive electrode y with the zinc content of 15% by mass and the alkaline electrolyte b with the lithium concentration of 0.21 mol/L (0.21 N) and the electrolyte concentration of 7.0 mol/L (7.0 N) were used) was used and the partial charge-discharge cycle was performed, and the battery system E1 wherein the battery E (the nickel positive electrode x with the zinc content of 5% by mass and the alkaline electrolyte a with the lithium concentration of 0.33 mol/L (0.33 N) and the electrolyte concentration of 6.5 mol/L (6.5 N) were used) was used and the partial charge-discharge cycle was performed, are compared.

Then, it is demonstrated that while the capacity retention ratio after a partial charge-discharge cycle of the battery A is 100, the capacity retention ratio after a partial charge-discharge cycle of the battery E is 130, which is improved significantly. It is also demonstrated that such improvement would not have been obtained independently by the effect of reducing the ratio of the mass of zinc to the mass of nickel in the nickel positive electrode, the effect of reducing the concentration of alkaline electrolyte, or the effect of increasing the lithium concentration in the alkaline electrolyte when the partial charge-discharge cycle was performed.

This result shows that a synergistic effect is obtained by a combination of these three factors (the factor of reducing the ratio of the mass of zinc to the mass of nickel in the nickel positive electrode, the factor of reducing the concentration of alkaline electrolyte, and the factor of increasing the lithium concentration in the alkaline electrolyte) in the battery system E1.

In this case, when the complete charge-discharge cycle was performed using the battery E as the battery system E2, it is demonstrated that the capacity retention ratio after a complete result is shown in Table 2 below. Table 2 also shows the initial capacity ratio after a 20-80% SOC partial charge-discharge cycle of the battery E described above.

TABLE 2

| battery system type | battery type | Zn amount in positive electrode (to Ni) (% by mass) | details of alkaline electrolyte | | charge-discharge condition | initial capacity ratio (to A1) |
| --- | --- | --- | --- | --- | --- | --- |
| | | | electrolyte concentration (mol/L) | Li concentration (mol/L) | | |
| E1 | E | 5 | 6.5 | 0.33 | p*1 | 130 |
| F1 | F | 3 | 6.5 | 0.33 | p*1 | 133 |

*1 partial charge-discharge charge-discharge cycle is reduced to 70. When the complete charge-discharge cycle is performed in the battery E, the positive electrode swells because the ratio of the mass of zinc to the mass of nickel in the nickel positive electrode is low. Therefore, the effect of increasing the lithium concentration in the alkaline electrolyte disappeared and then the capacity retention ratio was reduced, so that the effect of the combination of all three factors described above was not achieved.

From these results, for an achievement of the synergistic effect by the combination of all three factors including the factor of reducing the ratio of the mass of zinc to the mass of nickel in the nickel positive electrode, the factor of reducing the concentration of alkaline electrolyte, and the factor of increasing the lithium concentration in the alkaline electrolyte, it is revealed that the ratio of the addition amount of zinc to the amount of nickel in the positive electrode active material is 5% by mass or less in the nickel positive electrode, the concentration of alkaline electrolyte is 6.5 mol/L (6.5 N) or less, the amount of lithium (Li) contained in the alkaline electrolyte is 0.3 mol/L (0.3 N) or more, and the partial charge-discharge control must be performed.

5. Discussion on Reduction Amount of Zinc Added to Nickel Positive Electrode

Next, a reduction amount of zinc added to the nickel positive electrode was studied. A nickel positive electrode was formed so as to be a ratio of the mass of zinc in zinc hydroxide to the mass of nickel in nickel hydroxide as the positive electrode active material of 3% by mass, and the electrode was regarded as a nickel positive electrode z. An impregnation liquid with a molar ratio of nickel nitrate to zinc nitrate of 100:3 is used for forming the nickel positive electrode z with the ratio of the mass of zinc to the mass of nickel of 3% by mass. Next, a nickel-hydrogen storage battery F with a nominal capacity of 6 Ah and a D size (32 mm diameter and 60 mm high) was prepared using the obtained nickel positive electrode z and the alkaline electrolyte a in the same manner as described above.

Next, using the obtained battery F, an initial capacity X1 of the battery F and a battery capacity X3 after a partial charge-discharge cycle of the battery F (a capacity after a 20-80% SOC partial charge-discharge cycle) were calculated in the same manner as described above. Next, a ratio of the capacity X3 after a 20-80% SOC partial charge-discharge cycle to the initial capacity X1 obtained was calculated as an initial capacity ratio, and then a relative value of the initial capacity ratio of the battery F to that of the battery A was calculated, and the result is shown in Table 2 below.

As apparent from the results in Table 2 shown above, it is demonstrated that the initial capacity ratio after a partial charge-discharge cycle of the battery F prepared by using the nickel positive electrode z with the ratio of the mass of zinc to the mass of nickel in the nickel positive electrode of 3% by mass is improved a little more than the initial capacity ratio after a partial charge-discharge cycle of the battery E prepared by using the nickel positive electrode x with the ratio of the mass of zinc to the mass of nickel in the nickel positive electrode of 5% by mass, and the memory effect is more inhibited.

These results suggest that the more the ratio of the mass of zinc to the mass of nickel in the nickel positive electrode is reduced, the more the initial capacity ratio after a partial charge-discharge cycle is improved, and the memory effect is more inhibited. However, if the ratio of the mass of zinc to the mass of nickel in the nickel positive electrode is reduced very much, the nickel positive electrode and the like may deteriorate in charge and discharge at an initial activation stage. From these results, the addition amount of zinc is needed to be 5% by mass or less (0<addition amount of zinc≦5% by mass) with respect to the mass of nickel in the positive electrode active material.

6. Discussion on Partial Charge-Discharge Cycle Condition

Next, a condition of the partial charge-discharge cycle was studied. A charge-discharge cycle test was conducted by repeating a charge-discharge cycle was repeated wherein the battery E described above was charged at 10 It of charging current until a voltage level reached a state of charge (SOC) of 70% and then the battery was discharged at 10 It of discharging current until the voltage level reached an SOC of 30%. The partial charge-discharge cycle was repeated until the discharge strength reached 10 kAh.

Then, a battery capacity X4 after a partial charge-discharge cycle of the battery E (a capacity after a 30-70% SOC partial charge-discharge cycle) was calculated. Next, a ratio of the capacity X4 after a 30-70% SOC partial charge-discharge cycle to the obtained initial capacity X1 was calculated as an initial capacity ratio, then a relative value of the initial capacity ratio of the battery E to that of the battery A was calculated, and the result is shown in Table 3 below. Table 3 also shows the initial capacity ratio after a 20-80% SOC partial charge-discharge cycle of the battery E described above.

TABLE 3

| battery system type | battery type | Zn amount in positive electrode (to Ni) (% by mass) | details of alkaline electrolyte | | partial charge-discharge condition | initial capacity ratio (to A1) |
|---|---|---|---|---|---|---|
| | | | electrolyte concentration (mol/L) | Li concentration (mol/L) | | |
| E1 | E | 5 | 6.5 | 0.33 | SOC 20-80% | 130 |
| E3 | E | 5 | 6.5 | 0.33 | SOC 30-70% | 130 |

From the results shown in Table 3, whether the partial charge-discharge cycle is aimed at an SOC of 20 to 80% or 30 to 70% does not affect the initial capacity ratios after the partial charge-discharge cycle. Consequently, the condition of the partial charge-discharge cycle may be an SOC of 20 to 80%, 30 to 70%, or 10 to 90%, and practically it is preferred to be an SOC of 20 to 80%.

A common condition of the partial charge-discharge control can be defined that discharging is stopped and charging is started when the voltage reaches a level at which there occurs no variation among a plurality of batteries combined in a battery pack (in this case, a voltage level reaching an SOC of 10%), and charging is stopped and discharging is started when the voltage reaches a level just before reaching the oxygen overvoltage (in this case, a voltage level reaching an SOC of 95%). Practically, it is preferred that the partial charging-discharging be controlled so that discharging will be stopped and charging will be started when the voltage level reaches an SOC of 20% and so that charging will be stopped and discharging will be started when the voltage level reaches an SOC of 80%.

What is claimed is:

1. An alkaline storage battery system comprising:
   an alkaline storage battery including:
   an electrode group having a hydrogen storage alloy negative electrode using a hydrogen storage alloy as a negative electrode active material, a nickel positive electrode using nickel hydroxide as a main positive electrode active material, and a separator;
   an alkaline electrolyte; and
   an outer can accommodating the electrode group and the alkaline electrolyte;
   in the nickel positive electrode, zinc (Zn) being added to nickel hydroxide that is the main positive electrode active material with an addition amount of 5% by mass or less with respect to the mass of nickel in the positive electrode active material,
   the alkaline electrolyte having a concentration of 6.5 mol/L or less,
   the alkaline electrolyte containing lithium (Li) of 0.3 mol/L or more,
   the alkaline electrolyte containing sodium hydroxide, potassium hydroxide, and lithium hydroxide, and
   a charge-discharge control system being arranged to enable partial charge-discharge control of state of charge (SOC) only within the range of 20-80%.

2. The alkaline storage battery system according to claim 1, wherein the nickel positive electrode is formed of a nickel sintered plate having pores filled with at least nickel hydroxide as the main positive electrode active material and zinc by impregnation treatment with an impregnation liquid and alkaline treatment.

* * * * *